Patented June 24, 1952

2,601,310

UNITED STATES PATENT OFFICE 2,601,310

CHLORINATION OF (PERFLUOROALKYL) BENZENES

Earl T. McBee, West Lafayette, Ind., and Marvin R. Frederick, Wadsworth, Ohio, assignors to Purdue Research Foundation, West Lafayette, Ind., a corporation of Indiana No Drawing. Application June 1, 1948, Serial No. 30,508

6 Claims. (Cl. 260—651)

The present invention relates to a novel process for the chlorination of (perfluoroalkyl) benzenes, and is more particularly concerned with a such process for the vapor-phase chlorination of a (perfluoroalkyl)benzene in the presence of an activated carbon catalyst impregnated with an inorganic chloride.

Certain chloro(perfluoroalkyl)benzenes have shown excellent heat-transfer properties, exceptional thermal stability, and excellent dielectric properties. One procedure previously described for the preparation of chloro(trifluoromethyl)benzenes has involved chlorination of the (trifluoromethyl)benzene in the presence of iron (III) chloride. This procedure is not generally applicable, and bis(trifluoromethyl)benzenes, to mention one group, are not effectively chlorinated thereby. [See McBee et al., Ind. Eng. Chem. 39, 387–8 (1947).] Certain chlorobis(trifluoromethyl)benzenes have, however, been prepared by a procedure involving chlorination of xylene to bis(trichloromethyl)benzene followed by ring chlorination and subsequent fluorination of the chloro-bis(trichloromethyl)-benzenes. Others have been prepared by a procedure involving ring chlorination of the xylene, then side-chain chlorination followed by fluorination of the resulting chloro-(trichloromethyl)benzenes. Chloro-bis(trifluoromethyl)-benzenes which can be prepared in this manner are limited to those derived from corresponding chloro-bis(trichloromethyl)benzenes which are capable of preparation. It has also been impossible to prepare tetrachloro-bis(trifluoromethyl)benzenes in any manner, prior to the present invention, and it is apparent that an improved process for the preparation of chloro-(perfluoroalkyl)benzenes which would have general application would be highly desirable.

It is an object of the present invention to provide a novel method for the vapor-phase chlorination of a (perfluoroalkyl)benzene. Another object of the invention is the provision of a such process which is generally applicable in the preparation of chloro-(perfluoroalkyl)benzenes. A further object of the invention is the provision of a vapor-phase process for the chlorination of a (perfluoroalkyl)benzene in the presence of an activated carbon catalyst impregnated with an inorganic chloride. Other objects of the invention will become apparent hereinafter.

The foregoing and additional objects of the invention may be accomplished by mixing a (perfluoroalkyl)benzene, in the vapor phase, with chlorine, in the presence of a catalyst comprising activated carbon impregnated with an inorganic chloride. Such inorganic chlorides are preferably iron (III) chloride or antimony (V) chloride, although nickel chloride and other inorganic chlorides may also be employed.

The (perfluoroalkyl)benzene may be heated to its boiling temperature in a flask or other suitable reactor, vaporized therefrom, and introduced simultaneously with or in admixture with chlorine, into a reaction zone containing activated carbon impregnated with the desired inorganic chloride. Such a reactor may advantageously be constructed of nickel or glass, and may be heated electrically to a temperature above the boiling point of the desired chloro(perfluoroalkyl)benzene, so that the chlorinated product may issue from the reactor, be collected by means of a suitable condenser and collection train attached directly to the reactor, and, if desired, passed into a continuous rectifying column. Alternatively, the vapors issuing from the chlorination reactor may be passed through a water-cooled condenser of nickel or glass welded directly thereto, liquid returned to the distilling flask through a liquid trap and the gases vented to an appropriate scrubber.

The starting material for the method of the present invention may be any (perfluoroalkyl)-benzene, e. g., (perfluoromethyl)benzenes, (perfluoroethyl)benzenes, and the like. Bis(trifluoromethyl)benzenes may be made from the corresponding bis(trichloromethyl)benzenes by fluorination with anhydrous hydrogen fluoride in the presence of antimony (V) chloride at about room temperature in accord with the publication of McBee, Bolt, Graham, and Tebbe, J. Am. Chem. Soc. 69, 947–50 (1947). Bis(pentafluoroethyl)benzenes, 1-(pentafluoroethyl)-4-(trifluoromethyl)benzene, (heptafluoroisopropyl)benzenes, and 1-(heptafluoroisopropyl)-4-(trifluoromethyl)benzene may be prepared as described in the publications of McBee, Hass, Leech, Hodnett, Frederick, and Bonner, Ind. Eng. Chem. 39, 395–7 (1947), McBee and Pierce, Ind. Eng. Chem. 39, 397–9 (1947), and McBee and Pierce, loc. cit., 399–401, respectively. Partially ring-chlorinated derivatives of the foregoing are also suitable starting materials, and may be prepared in known manner.

The impregnated activated carbon catalyst may be prepared by soaking finely-divided activated carbon in a suitable liquid containing the particular inorganic chloride desired to be employed, and then drying, as by heating for a short period of time at a temperature of about 300 degrees centigrade. For example, an activated carbon-antimony (V) chloride catalyst may be prepared by soaking activated carbon (8/14 mesh) in antimony (V) chloride and then heating to 300 degrees centigrade. An activated carbon-iron (III) chloride catalyst may be prepared by soaking 200 grams of activated carbon in a solution of 60 grams of iron (III) chloride and 200 milliliters of water made slightly acidic with hydrochloric acid. After soaking for one hour, the carbon may be heated, e. g., at about 300 degrees centigrade, to remove any adsorbed water. Alternatively, the selected metal may be intimately admixed with the activated carbon and the chloride generated in the admixture by passage of chlorine gas there-through. Other methods of preparing the catalyst are suitable and will be apparent to one skilled in the art.

The chlorine which is introduced into the reactor containing the activated carbon impregnated with a metallic chloride is ordinarily introduced above the surface of the (perfluoroalkyl)benzene being vaporized, and is carried with the vapors of the (perfluoroalkyl)benzene into the reactor, where chlorination occurs. The amount of chlorine introduced should ordinarily be at least one mole for every hydrogen atom desired to be replaced with chlorine, inasmuch as one-half of the chlorine will be utilized in the formation of hydrogen chloride. It is preferred to use chlorine in excess of one mole for every atom of hydrogen desired to be replaced in the starting compound. The chlorine is advantageously introduced continuously with the (perfluoroalkyl)benzene in the vapor phase into the reactor, and, if the product vapors are taken off the top of the reactor, condensed, and recycled to the flask, more highly chlorinated products are thus produced. If, on the other hand, it is desired to produce monochlorinated compounds, it is a simple matter to condense the products from the chlorination reactor and fractionate the same without a recycle. The temperature of the reaction zone wherein chlorination is effected between the (perfluoroalkyl)benzene and the activated carbon catalyst impregnated with the metallic chloride is usually maintained between about 150 and 300 degrees centigrade and is ordinarily at least as high as the boiling point of the lowest-boiling chlorinated product. This factor is of some importance, inasmuch as, if the reaction temperature is not maintained above this point, clogging of the reactor may occur.

The reaction temperature may be conveniently maintained above the boiling point of the (perfluoroalkyl)benzene, e. g., between about 150 and 300 degrees centigrade, within which range the chlorination proceeds readily. The employment of iron (III) chloride has a technical advantage over antimony (V) chloride, inasmuch as the iron catalyst shows little decrease in activity with use, and a catalyst having over 150 hours of use is usually as effective as when first prepared. Contrastingly, some antimony (V) chloride appears to distill from the reactor, and, as a consequence, a decline in catalyst activity is sometimes noted. Nickel chloride on activated carbon is of about the same activity as iron (III) chloride, with cerium, manganese, and lead chlorides being somewhat less effective, but iron, iron (III) chloride or activated carbon alone have been found not to have the same effectiveness as a combination of the carbon and inorganic chloride.

The procedure employed in the chlorination of the (perfluoroalkyl)benzenes may be illustrated by the following examples, which, however, are not to be construed as limiting.

*Example 1*

One thousand two hundred sixty-three grams (5.9 moles) of technical bis(trifluoromethyl)benzene was poured into a three-neck flask fitted with a chlorine inlet, thermometer, and connection to a nickel reactor filled with activated carbon impregnated with iron (III) chloride. The activated-carbon reactor, comprising a length of nickel tubing about 20 millimeters by 500 millimeters, was heated to 200 degrees centigrade, the material in the flask heated to reflux at about 114 degrees centigrade, and chlorine added above the surface of the liquid in the flask at the rate of about 0.8 mole per hour. The nickel reactor was connected to a condenser and thence to a tube leading back into the reactor flask, by which system the product was continually recycled in the process. Chlorination was continued for 29 hours, at the end of which time the boiling point of the material in the flask was 127 degrees centigrade. The product was then removed from the flask, washed with dilute sodium bicarbonate solution, water, dried, and rectified.

There was obtained 351 grams (1.64 moles) of bis(trifluoromethyl)benzene, 671 grams (2.7 moles) of chloro-bis(trifluoromethyl)benzenes [5-chloro-1,3-bis(trifluoromethyl)benzene, B. P. 137–137.5 degrees centigrade; 2-chloro-1,4-bis(trifluoromethyl)benzene, B. P. 147–148 degrees centigrade] and 272 grams (0.96 mole) of dichloro-bis(trifluoromethyl)benzenes. The conversions to chloro- and dichloro-bis(trifluoromethyl)benzenes were 46 and 16 percent, respectively. The yield of chloro-bis(trifluoromethyl)benzene was 86 percent; and the recovery was 90 percent. Continuation of the chlorination for a longer period of time produced a preponderance of polychlorinated material.

*Example 2*

The nickel reactor was used with activated carbon impregnated with iron (III) chloride as the catalyst. Two thousand eight hundred grams (13.1 moles) of bis(trifluoromethyl)benzenes were placed in a reaction flask. This material was heated until it refluxed; B. P. 114 degrees centigrade. The reactor was heated to 200 degrees centigrade and chlorine flow adjusted to 0.8 to 1 mole per hour. The experiment was controlled carefully and proceeded smoothly, the time of reaction being 82 hours, and product being recycled as in Example 1. The products were treated as described previously.

Rectification yielded: 930 grams (4.35 moles) of bis(trifluoromethyl)benzenes, 1189 grams (4.78 moles) of chloro-bis(trifluoromethyl)benzenes, 476 grams (1.68 moles) of dichloro-bis(trifluoromethyl)benzenes, and 236 grams (0.75 mole) of trichloro-bis(trifluoromethyl)benzenes. The conversions to the chloro-, dichloro-, and trichloro-bis(trifluoromethyl)benzenes were 36.5, 12.9, and 5.7 percent, respectively. The yield of the chloro-bis(trifluoromethyl)benzenes was 82 percent. The recovery for the experiment was 88 percent of the theoretical.

*Example 3*

The nickel reactor contained activated carbon impregnated with iron (III) chloride. One thousand seventy grams (5 mols) of bis(trifluoromethyl)benzenes were placed in the reaction flask. This material was heated until it refluxed; B. P. 114 degrees centigrade. The reactor was heated to 200 degrees centigrade and chlorine flow regulated to 0.8 to 1 mole per hour. After 72 hours, the boiling point of the contents of the reaction flask was 165 degrees centigrade and the reactor temperature was raised to 250 degrees centigrade. At the end of 95 hours, the reflux temperature in the flask was 180 degrees centigrade. The chlorination was stopped, the product washed with sodium bicarbonate solution and water, and then dried.

The product was rectified to yield: 450 grams (1.59 moles) of dichloro-bis(trifluoromethyl)benzene, 202 grams (0.64 mole) of trichloro-bis(trifluoromethyl)benzene, and 326 grams (0.93 mole) of tetrachloro-bis(trifluoromethyl)benzene. The conversions to the di-, tri-, and the tetrachloro compounds were 32, 13, and 18 percent, respectively. The recovery for the experiment was 63 percent of the theoretical.

*Example 4*

The nickel reactor containing the iron (III) chloride-carbon catalyst was employed. The chlorine flow was 0.8 to 1 mole per hour, and the reactor temperature was 200 degrees centigrade.

Nine hundred sixty-six grams (3.66 moles) of 1-(pentafluoroethyl)-4-(trifluoromethyl)benzene was placed in the flask and heated to the initial boiling point of the contents of the flask, 127 degrees centigrade. After 12 hours of chlorination, the boiling point was 157 degrees centigrade. The reaction was stopped, product washed with sodium bicarbonate solution and water, and dried. The monochloro compounds were separated by rectification. One hundred seventy-four grams (0.58 mole) of chloro-1-(pentafluoroethyl)-4-(trifluoromethyl)benzenes were obtained.

The residue was placed back in the flask and rechlorinated for another six hours, the initial boiling point being 180 degrees centigrade and the final boiling point 190 degrees centigrade. This product was treated as described previously. The rectification gave 349 grams (1.04 moles) of 2,5-dichloro-1-(pentafluoroethyl)-4-(trifluoromethyl)benzene, 210 grams (0.57 mole) of trichloro-1-(pentafluoroethyl)-4-(trifluoromethyl)benzene, and 161 grams (0.40 mole) of tetrachloro-1-(pentafluoroethyl)-4-(trifluoromethyl)benzene. The yield of chlorinated product was 71 per cent.

*Example 5*

Three hundred forty-nine grams (1.1 moles) of bis(pentafluoroethyl)benzenes were chlorinated for three hours in the manner of the preceding examples. The initial boiling point of the contents of the reaction flask was 140 degrees centigrade. The final boiling point was 150 degrees centigrade.

The product was purified in the usual manner. Rectification gave 182 grams (0.58 mole) of bis(pentafluoroethyl)benzenes, 17 grams (0.05 mole) of 5-chloro-1,3-bis(pentafluoroethyl)benzene, 56 grams (0.16 mole) of 2-chloro-1,4-bis(pentafluoroethyl)benzene, and 71 grams (0.19 mole) of dichloro-bis(pentafluoroethyl)benzenes. The conversion and yield of the monochloro compounds were 19 and 38 percent, respectively, while recovery was 89 percent of the theoretical.

The polychlorinated products from several runs were combined and rechlorinated in the usual manner. The initial boiling point of the contents of the flask was 174 degrees centigrade. After four hours, the boiling point was 189 degrees centigrade; the reaction was stopped and the products purified in the usual manner. The di-, tri-, and tetrachloro compounds were separated into their respective fractions. Upon cooling, the 2,5-dichloro-1,4-bis(pentafluoroethyl)benzene and tetrachloro-1,4-bis(pentafluoroethyl)benzene crystallized from the dichloro and tetrachloro fractions, respectively.

*Example 6*

Four hundred and ninety-five grams (2.31 moles) of 1,2-bis(trifluoromethyl)benzenes ($n_D^{20}$ 1.3935; B. P. 130 degrees centigrade at 745 millimeters of mercury pressure) was placed in a glass flask fitted with chlorine inlet, thermometer, and an outlet leading to a reactor comprising a length of nickel tubing filled with activated carbon impregnated with iron (III) chloride maintained at a temperature of about 200 degrees centigrade. The activated carbon reactor was connected to a condenser, and a tube led from the bottom of the condenser back into the reaction flask. Chlorine was introduced at a rate of one mole per hour over a period of 20 hours, the reflux temperature of the mixture in the flask changing from 140 to 150 degrees centigrade during the reaction. Rectification produced 70 grams (0.28 mole) of 4-chloro-1,2-bis(trifluoromethyl)benzene, B. P. 157–160 degrees centigrade; 116 grams (0.41 mole) of the dichloride boiling at 173–195 degrees centigrade; 154 grams (0.49 mole) of trichloride boiling at 195–240 degrees centigrade; and, 36 grams (0.10 mole) of the tetrachloride having a boiling point at 745 millimeters of mercury pressure of 245 degrees centigrade and a melting point upon crystallization from ethanol of 44 degrees centigrade. According to the rough divisions above, conversions to the mono-, di-, tri-, and tetrachloro compounds were 12 percent, 18 percent, 21 percent, and 4 percent, respectively. The monochloride was shown to be 4-chloro-1,2-bis(trifluoromethyl)benzene by conversion to 4-chlorophthalic acid.

*Example 7*

In the same reactor as employed in Example 6, 1263 grams of bis(trifluoromethyl)benzenes (5.9 moles) were heated to an initial temperature of 114 degrees centigrade, the boiling point of the starting material. The vapors were passed with 0.8 mole of chlorine per hour through the nickel reactor containing activated carbon impregnated with antimony (V) chloride over a period of 24 hours at a reactor temperature of 250 degrees centigrade, the product being returned via the condenser to the flask. The final boiling point of the mixture was 135 degrees centigrade, and the product was found upon rectification to consist of 155 grams (0.72 mole) of starting material, 224 grams (0.9 mole) of chloro-bis(trifluoromethyl)benzenes, 367 grams (1.3 moles) of dichloro-bis(trifluoromethyl)benzenes, and 295 grams (0.93 mole) of trichloro-bis(trifluoromethyl)benzenes. The conversions to the mono-, di-, and trichloro compounds were 12, 22, and 16 percent, respectively. The yield of the chloro compounds was 60 percent and the recovery 65 percent.

Example 8

In a run similar to that of Example 7, wherein the reactor temperature was maintained at 200 degrees centigrade and the mixture of final products was allowed to attain a boiling point of 118 degrees centigrade, conducted over a period of 32 hours, the product was found to consist of 763 grams (3.56 moles) of starting material, 214 grams (0.86 mole) of chloro-bis(trifluoromethyl)benzenes, and 70 grams of dichloro-bis(trifluoromethyl)benzene. The conversion to the monochloro compound was 14.6 percent, and to the dichloro compound 4.2 percent. The yield of chloro derivatives was 47 percent.

Example 9

The 1,4-bis(trifluoromethyl)benzene (6.24 moles) was poured into a distillation flask and chlorinated at 250 degrees centigrade according to the manner of the previous examples for 36 hours, at which time the boiling temperature of the mixture in the flask was 132 degrees centigrade. After cooling, the product was removed from the flask, washed, dried and rectified. Upon rectification there was obtained 383 grams (1.79 moles) of 1,4-bis(trifluoromethyl)benzene, 414 grams (166 moles) of 2-chloro-1,4-bis(trifluoromethyl)benzene, 368 grams (1.30 moles) of 2,5-dichloro-1,4-bis(trifluoromethyl)benzene, and 84 grams (0.27 mole) of 2,3,5-trichloro-1,4-bis(trifluoromethyl)benzene. The yield of the chlorinated product was 72 percent.

Example 10

2-chloro-1,4-bis(trifluoromethyl)benzene (734 grams, 2.94 moles) was charged to the distillation flask and chlorinated at 200 degrees centigrade in the manner of the previous examples, the time of the chlorination being 19 hours. Upon rectification, the product was found to contain 322 grams (1.14 moles) of 2,5-dichloro-1,4-bis(trifluoromethyl)benzene, 184 grams (0.58 mole) of 2,3,5-trichloro-1,4-bis(trifluoromethyl)benzene, and 111 grams (0.32 mole) of tetrachloro-1,4-bis(trifluoromethyl)benzene, the conversions being 39 percent, 20 percent, and 11 percent, respectively. The yield of chlorinated product was 69 percent.

Example 11

1,3-bis(trifluoromethyl)benzene (3.72 moles) was chlorinated at 200 degrees centigrade in the usual manner with the time of chlorination being 48 hours. Upon rectification of the product there was obtained 67 grams (0.31 mole) of 1,3-bis(trifluoromethyl)benzene, 280 grams (1.12 moles) of 5-chloro-1,3-bis(trifluoromethyl)benzene, 262 grams (0.93 mole) of dichloro-1,3-bis(trifluoromethyl)benzene, and 256 grams (0.81 mole) of trichloro-1,3-bis(trifluoromethyl)benzene. Conversions to the chloro compounds were 22 percent, 19 percent, and 16 percent, respectively. The yield was 87 percent.

Example 12

In a manner similar to that of the preceding examples, (heptafluoroisopropyl)benzene and 1-(heptafluoroisopropyl)-4-(trifluoromethyl)benzene are chlorinated using an activated carbon catalyst impregnated with iron (III) chloride, antimony (V) chloride, nickel chloride, or other metallic chlorides to produce the corresponding ring-chlorinated compounds.

Example 13

Bis(trifluoromethyl)benzenes (technical, 1263 grams, 5.9 moles) were vaporized and introduced into a nickel tube reactor containing activated carbon which had absorbed nickel chloride salts. The procedure was in the manner of Example 1, the reactor being maintained at about 200 degrees centigrade; original and final boiling points of the organic material being 114 and 123 degrees centigrade, respectively; and chlorine introduction at 0.8 mole per hour being continued over a period of 34 hours. Upon separation and purification, 632 grams (2.95 moles) of starting material, 438 grams (1.76 moles) of chloro-bis(trifluoromethyl)benzenes, and 180 grams (0.64 mole) of dichloro-bis(trifluoromethyl)benzenes were obtained. Conversions were 29.8 and 10.7 percent, respectively. The yield of monochloro compound was 59.6 percent. Total recovery was 91 percent.

Various modifications may be made in the method of the present invention without departing from the spirit or scope thereof, and it is to be understood that we limit ourselves only as defined in the appended claims.

We claim:

1. A process for the chlorination of (perfluoroalkyl)benzenes, which comprises: introducing a starting compound having the formula:

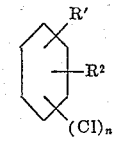

wherein $R'$ and $R^2$ are perfluoroalkyl groups having up to three carbon atoms and wherein $n$ is an integer from 0–3, inclusive, in the vapor phase, into a reaction zone containing activated carbon impregnated with a metallic chloride selected from the group consisting of iron (III), antimony and nickel chlorides, said reaction zone maintained at a temperature between approximately 150 and 300 degrees centigrade; concurrently introducing chlorine, in an amount at least sufficient to replace the desired number of hydrogen atoms in said starting compound with conversion of the replaced hydrogen atoms to hydrogen chloride, and separating from the reaction mixture a (perfluoroalkyl)benzene having a higher chlorine content than said starting compound.

2. A process according to claim 1, wherein the metallic chloride employed is iron (III) chloride.

3. A process according to claim 1, wherein the starting compound is bis-(trifluoromethyl)benzene.

4. A process according to claim 1, wherein the metallic chloride employed is nickel chloride.

5. A process which comprises: introducing bis-(trifluoromethyl)benzene, in the vapor phase, into a reaction zone containing activated carbon impregnated with iron (III) chloride, said reaction zone maintained at a temperature between approximately 150 and 300 degrees centigrade, concurrently introducing chlorine, in an amount at least sufficient to replace the desired number of hydrogen atoms in the bis-(trifluoromethyl)benzene with conversion of the replaced hydrogen atoms to hydrogen chloride, and, separating a chlorinated bis-(trifluoromethyl)benzene from the reaction mixture.

6. A process according to claim 5, in which the reaction zone is maintained at a temperature of about 200 degrees centigrade.

EARL T. McBEE.
MARVIN R. FREDERICK.

REFERENCES CITED

The following references are of record in the file of this patent:

UNITED STATES PATENTS

| Number | Name | Date |
| --- | --- | --- |
| 2,123,857 | Wibaut et al. | July 12, 1938 |

FOREIGN PATENTS

| Number | Country | Date |
| --- | --- | --- |
| 388,818 | Great Britain | Mar. 6, 1933 |

OTHER REFERENCES

McBee et al., "Ind. & Eng. Chem.," vol. 39, pages 387–8 (1947).